United States Patent
Liao et al.

(10) Patent No.: US 12,522,711 B2
(45) Date of Patent: Jan. 13, 2026

(54) METHOD FOR PRODUCING RECYCLED POLYESTER CHIPS FROM RECYCLED POLYESTER FABRIC

(71) Applicant: NAN YA PLASTICS CORPORATION, Taipei (TW)

(72) Inventors: Te-Chao Liao, Taipei (TW); Jung-Jen Chuang, Taipei (TW); Zhang-Jian Huang, Taipei (TW); Yu-Ti Tseng, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 797 days.

(21) Appl. No.: 17/862,730

(22) Filed: Jul. 12, 2022

(65) Prior Publication Data

US 2023/0080748 A1    Mar. 16, 2023

(30) Foreign Application Priority Data

Sep. 13, 2021    (TW) ................................ 110133953

(51) Int. Cl.
*C08J 11/24*    (2006.01)

(52) U.S. Cl.
CPC ............ *C08J 11/24* (2013.01); *C08J 2367/02* (2013.01)

(58) Field of Classification Search
CPC ................................ C08J 11/24; C08J 2367/02
See application file for complete search history.

(56) References Cited

U.S. PATENT DOCUMENTS

| | | | |
|---|---|---|---|
| 6,090,860 A | * | 7/2000 | Peters ..................... C09D 9/04 528/499 |
| 9,255,194 B2 | | 2/2016 | Allen et al. |
| 2006/0074136 A1 | | 4/2006 | Smith et al. |

(Continued)

FOREIGN PATENT DOCUMENTS

| | | |
|---|---|---|
| CN | 100344604 C | 10/2007 |
| CN | 103374144 A | 10/2013 |

(Continued)

OTHER PUBLICATIONS

Machine translation of JP 2010126660 by Shimoji. (Year: 2010).*

(Continued)

*Primary Examiner* — Christina H. W. Rosebach
(74) *Attorney, Agent, or Firm* — Li & Cai Intellectual Property (USA) Office

(57) ABSTRACT

A method for producing recycled polyester chips from a recycled polyester fabric is provided. The method includes: providing the recycled polyester fabric attached with dyes and/or coating glue; performing a color removal process to at least partially remove the dyes and/or the coating glue attached to the polyester fabric; performing a de-polymerization process which includes: using a chemical de-polymerization liquid to chemically depolymerize the recycled polyester fabric, so as to form a de-polymerization product containing bis(2-hydroxyethyl) terephthalate (BHET) and oligomers; performing a purification process, so as to enhance a purity of the BHET in the de-polymerization product; and performing a granulation process, so as to re-polymerize the purified BHET and form the recycled polyester chips (r-PET).

7 Claims, 1 Drawing Sheet

(56) References Cited

U.S. PATENT DOCUMENTS

| | | | |
|---|---|---|---|
| 2009/0133200 A1 | | 5/2009 | Mukai et al. |
| 2022/0169786 A1* | | 6/2022 | Takao ............... C08J 11/24 |
| 2024/0287279 A1* | | 8/2024 | Chiche .............. C08J 11/24 |

FOREIGN PATENT DOCUMENTS

| | | | | |
|---|---|---|---|---|
| CN | 108641120 A | | 10/2018 | |
| CN | 106146877 B | | 2/2019 | |
| CN | 112391036 A | | 2/2021 | |
| JP | 200616548 A | | 1/2006 | |
| JP | 2010-126660 | † | 6/2010 | |
| JP | 2010126660 A | | 6/2010 | |
| KR | 10-2008-0041681 | † | 5/2008 | |
| KR | 10-2011-0080260 | † | 7/2011 | |
| WO | WO2007018161 A1 | | 2/2007 | |
| WO | WO-2020213032 A1 * | | 10/2020 | ........... C08G 63/183 |

OTHER PUBLICATIONS

Goh, H.W. et al. (2015). Time, Temperature and Amount of Distilled Water Effects on the Purity and Yield of Bis(2-hydroxyethyl) Terephthalate Purification System. Bulletin of Chemical Reaction Engineering & Catalysis, 10 (2): 143-154. (doi: 10.9767/bcrec.10. 2.7195.143-154) (Year: 2015).*

\* cited by examiner
† cited by third party

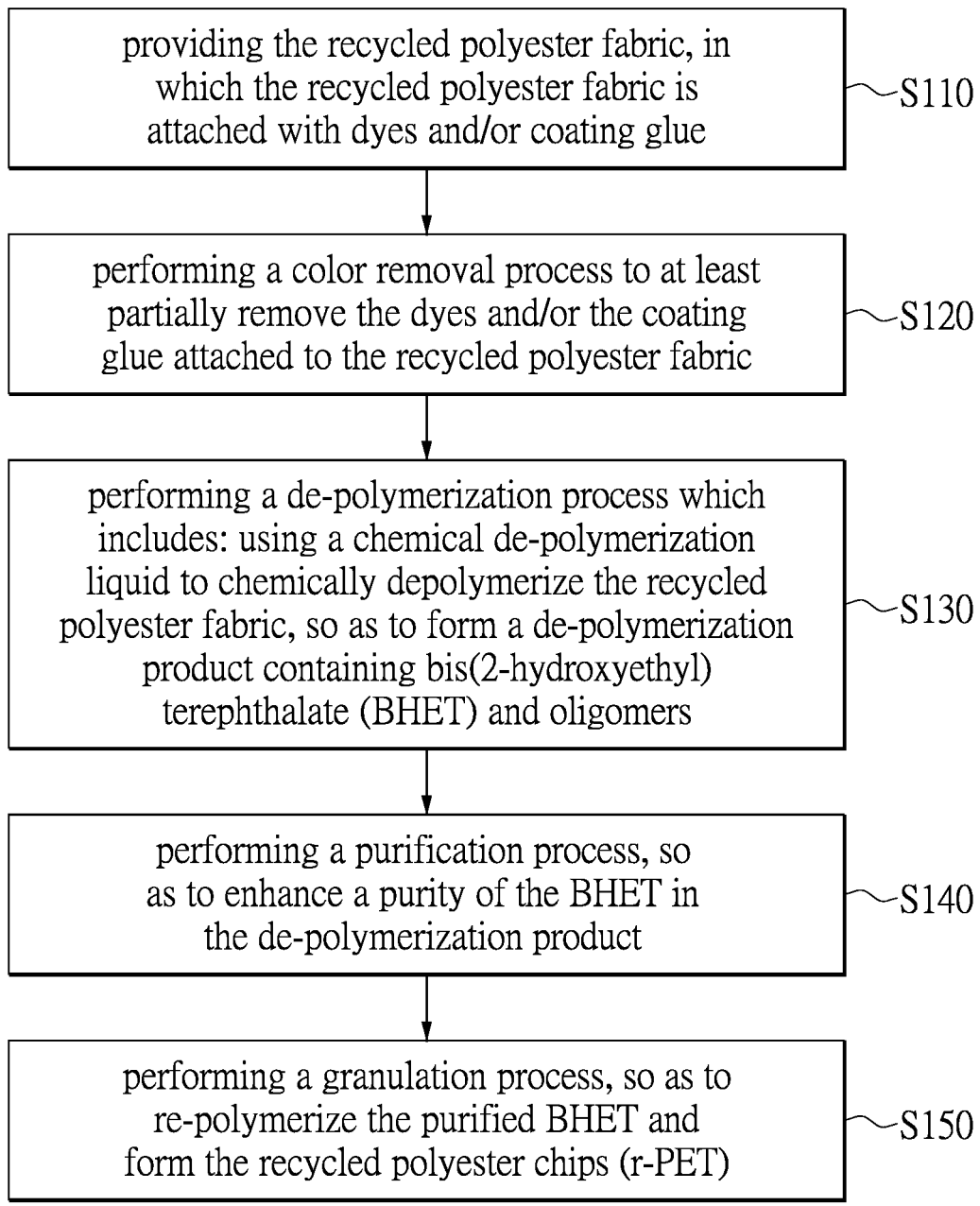

METHOD FOR PRODUCING RECYCLED POLYESTER CHIPS FROM RECYCLED POLYESTER FABRIC

CROSS-REFERENCE TO RELATED PATENT APPLICATION

This application claims the benefit of priority to Taiwan Patent Application No. 110133953, filed on Sep. 13, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for producing recycled polyester chips, and more particularly to a method for producing recycled polyester chips from a recycled polyester fabric.

BACKGROUND OF THE DISCLOSURE

In the related art, a chemical recycling method of a PET (polyester) fabric primarily uses a chemical de-polymerization liquid (e.g., ethylene glycol) to chemically depolymerize the PET fabric, so as to form a de-polymerization product. The de-polymerization product mainly contains bis(2-hydroxyethyl) terephthalate (BHET). However, the aforementioned chemical recycling method requires complicated purification procedures to remove impurities such as dyes and coating glue originally present in the PET fabric, so that the BHET can be re-polymerized to form high-quality recycled polyester chips (r-PET).

In the above-mentioned purification procedures, the PET fabric attached with the impurities such as dyes and coating glue is conventionally subjected to direct chemical de-polymerization, so as to form the de-polymerization product that contains the BHET and the impurities. Then, the de-polymerization product is subjected to complicated purification procedures (such as filtering with a filter screen, adsorption with activated carbon, treatment with an ion exchange resin, EG-phase crystallization and water-phase crystallization) to remove the impurities so that high-purity BHET can be obtained. However, the conventional chemical recycling method has problems such as an extremely low recovery rate of the BHET and over-complicated purification procedures, which can cause a material recovery cost to be excessively high.

U.S. Pat. No. 9,255,194 proposes a method for depolymerizing the PET fabric. Although the method proposed in this patent can completely remove dyes and other impurities whilst recycling catalysts, the method still needs complicated purification procedures for BHET purification, thereby resulting in a low recovery rate and a poor recovery quality of the BHET.

U.S. Pat. No. CN 100,344,604 proposes a method for depolymerizing the PET fabric, and the method also requires complicated purification procedures for BHET purification, thereby resulting in an extremely high material recovery cost and a poor recovery quality of the BHET.

SUMMARY OF THE DISCLOSURE

In response to the above-referenced technical inadequacies, the present disclosure provides a method for producing recycled polyester chips from a recycled polyester fabric.

In one aspect, the present disclosure provides a method for producing recycled polyester chips from a recycled polyester fabric. The method includes: providing a recycled polyester fabric that is attached with dyes and/or coating glue, performing a color removal process to at least partially remove the dyes and/or the coating glue attached to the recycled polyester fabric, performing a de-polymerization process which includes: using a chemical de-polymerization liquid to chemically depolymerize the recycled polyester fabric, so as to form a de-polymerization product containing bis(2-hydroxyethyl) terephthalate (BHET) and oligomers, performing a purification process, so as to enhance a purity of the BHET in the de-polymerization product, and performing a granulation process, so as to re-polymerize the purified BHET and form the recycled polyester chips (r-PET).

Preferably, after the color removal process, the dyes and/or the coating glue attached to the recycled polyester fabric are at least partially removed, so that a whiteness of the recycled polyester fabric is increased to obtain a first L value of not less than 70, and a content of the coating glue in the recycled polyester fabric is reduced to a concentration of not greater than 500 ppm (parts per million).

Preferably, the recycled polyester chips formed by the granulation process have a recovery rate of not less than 80% and a second L value of not less than 55.

Preferably, the de-polymerization process is further defined to be performed after the color removal process, so that the dyes and/or the coating glue attached to the recycled polyester fabric are at least partially removed before the recycled polyester fabric is chemically depolymerized by the chemical de-polymerization liquid.

Preferably, in the color removal process, the dyes and/or the coating glue attached to the recycled polyester fabric are removed by using an extraction solvent to infiltrate the recycled polyester fabric and by extracting the dyes and/or the coating glue to at least partially remove the dyes and/or the coating glue from the recycled polyester fabric, so that a whiteness of the recycled polyester fabric is increased and a content of the coating glue in the recycled polyester fabric is reduced.

Preferably, the extraction solvent contains at least one of acetic acid, toluene, propylene glycol methyl ether and ethylene glycol.

Preferably, the color removal process includes: using an oxidizing agent and/or a reducing agent to trigger an oxidizing reaction and/or a reducing reaction of the dyes attached to the recycled polyester fabric, so that the dyes lose an original color thereof and a whiteness of the recycled polyester fabric is increased.

Preferably, the reducing agent is at least one material selected from a group consisting of sodium thiosulfate, sodium dithionite, sodium hydroxy-methane-sulfinate, thiourea dioxide, sodium hypophosphite, hydrogen, lithium aluminum hydride, sodium borohydride, zinc, carbon monoxide, hydrazine, and tin (II) chloride. The oxidizing agent is at least one material selected from a group consisting of hydrogen peroxide, ozone, nitric acid, nitrates, potassium permanganate, sodium chlorate, calcium chlorate, chlorates, perchlorates, sodium hypochlorite, calcium hypochlorite, hypochlorites, sodium perborate, perborates, sodium dichromate, and dichromates.

Preferably, the purification process includes: using an activated carbon to adsorb impurities remaining in the de-polymerization product, so as to enhance the purity of the BHET.

Preferably, the purification process includes: dissolving the purified BHET in water, and crystallizing the BHET by a cooling process.

Therefore, in the method for producing the recycled polyester chips from the recycled polyester fabric provided by the present disclosure, by virtue of "providing the recycled polyester fabric attached with dyes and/or coating glue; performing a color removal process to at least partially remove the dyes and/or the coating glue attached to the polyester fabric; performing a de-polymerization process which includes: using a chemical de-polymerization liquid to chemically depolymerize the recycled polyester fabric, so as to form a de-polymerization product containing bis(2-hydroxyethyl) terephthalate (BHET) and oligomers; performing a purification process, so as to enhance a purity of the BHET in the de-polymerization product; and performing a granulation process, so as to re-polymerize the purified BHET and form the recycled polyester chips (r-PET)," process units in BHET purification procedures can be reduced, the complexity of BHET purification can be lowered, and a yield and a quality of the BHET can be improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1 is a flowchart of a method for producing recycled polyester chips from a recycled polyester fabric according to an embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Method for Producing Recycled Polyester Chips From Recycled Polyester Fabric After color removal and glue removal, a recycled PET fabric is chemically depolymerized with ethylene glycol to form a crude BHET product. The crude BHET product is added to water, which is heated to 90° C. for dissolving BHET. Then, an activated carbon is added to adsorb impurities and remove color. After the activated carbon is filtered out, such an aqueous solution is cooled to 5° C. to crystallize the BHET and white BHET is obtained by filtering (2 purification procedures in total). The white BHET is re-polymerized, so as to form recycled polyester chips (r-PET).

Conventionally, the recycled PET fabric (such as clothes and garment trims) is often attached with the impurities such as dyes and coating glue (e.g., water repellents).

In the related art, a chemical de-polymerization liquid (e.g., ethylene glycol) is used to chemically depolymerize the PET fabric, so as to form a de-polymerization product mainly containing bis(2-hydroxyethyl) terephthalate (BHET).

The aforementioned de-polymerization product further goes through a series of BHET purification procedures, which at least include 1 procedure of crystallizing the BHET with ethylene glycol (EG), 2 procedures of adsorbing the impurities with the activated carbon, and 2 procedures of crystallizing the BHET in a water phase (at least 5 purification procedures in total), so as to obtain purified BHET. Then, the purified BHET is re-polymerized to form the recycled polyester chips (r-PET).

However, a conventional chemical recycling method can result in an extremely low recovery rate of the BHET and over-complicated purification procedures, thereby causing a material recovery cost to be excessively high.

In order to solve the aforementioned technical problems, referring to FIG. 1, an embodiment of the present disclosure provides a method for producing recycled polyester chips from a recycled polyester fabric, which can effectively simplify the BHET purification procedures and improve a yield and a quality of the BHET. The method for producing the recycled polyester chips from the recycled polyester fabric includes a step S110, a step S120, a step S130, a step S140 and a step S150. It should be noted that the sequence of the steps and the actual ways of process described in this embodiment can be adjusted according to requirements, and are not limited to those described in the present embodiment.

On the whole, in the embodiment of the present disclosure, the method for producing the recycled polyester chips from the recycled polyester fabric primarily performs a pretreatment process on the PET fabric to remove impurities such as dyes and coating glue before chemical recycling of the PET fabric. Through this method, the BHET purification procedures can be effectively reduced (only 2 purification procedures are needed), and the recovery rate (at least above 80%) of the BHET in the recycled polyester chips (r-PET)

as well as a quality (L>55%, a=−2 to 2, b=−6 to 6) of the r-PET can be improved. The steps in the method for producing the recycled polyester chips according to the embodiment of the present disclosure will be described below in detail.

The step S110 includes: providing a recycled polyester fabric, in which the recycled polyester fabric is attached with dyes and/or coating glue, and the coating glue can be, for example, a water repellent. However, the present disclosure is not limited hereto.

More specifically, the recycled polyester fabric has a color (e.g., black, red, and blue) obtained by dyeing with a dye, and can obtain a water-repellent function through a water repellent treatment. Generally speaking, the dye is mainly attached to a fiber structure of the polyester fabric (particularly in an amorphous area), and the water repellent covers the fiber structure and the dye.

The dye can be, for example, at least one of natural dyes and synthetic dyes, or at least one of physical dyes and chemical dyes. Further, the coating glue can have, for example, a polymer network crosslinked structure. The coating glue can also be, for example, a water repellent containing silicon (Si), a water repellent containing fluorine (F), a water repellent containing fluorine and silicon, or a waterborne polyurethane (PU) water repellent, but the present disclosure is not limited hereto.

In one embodiment of the present disclosure, the recycled polyester fabric is dyed to obtain an L value of greater than 0 and not greater than 30. That is, the recycled polyester fabric has a relatively dark color, but the present disclosure is not limited hereto. It should be noted that the aforementioned L value is a parameter value expressing brightness (also known as whiteness of color) in a Lab color space.

The step S120 includes: performing a color removal process to at least partially remove the dyes and/or the coating glue attached to the recycled polyester fabric.

In one embodiment of the present disclosure, after the color removal process, the dyes and/or coating glue attached to the recycled polyester fabric are at least partially removed (or the dyes are subjected to color removal), so that the whiteness of the recycled polyester fabric is increased to obtain a first L value of not less than 70 (a=−2 to 2, and b=−4 to 4). Further, a content of the coating glue in the recycled polyester fabric is reduced to a concentration of not greater than 500 ppm (parts per million), and preferably not greater than 200 ppm.

That is to say, the impurities such as dyes and coating glue are almost removed from the recycled polyester fabric before chemical recycling, thereby simplifying the follow-up BHET purification procedures.

In one embodiment of the present disclosure, the dyes and/or the coating glue attached to the recycled polyester fabric can be removed by using an extraction solvent to infiltrate the recycled polyester fabric and by extracting the dyes and/or the coating glue to at least partially remove the dyes and/or the coating glue from the recycled polyester fabric, so that the whiteness of the recycled polyester fabric is increased and the content of the coating glue in the recycled polyester fabric is reduced.

In terms of material type, the extraction solvent includes at least one of acetic acid, toluene, propylene glycol methyl ether (PM) and ethylene glycol (EG). These organic solvents have a relatively high extraction efficiency with respect to the dyes and/or the coating glue, but the extraction solvent of the present disclosure is not limited to the aforementioned embodiment.

Further, the recycled polyester fabric has a glass transition temperature (Tg). In the aforementioned color removal process, the extraction solvent is heated to an extraction temperature to infiltrate the recycled polyester fabric and extract the dyes and/or coating glue, so that the dyes and/or the coating glue are at least partially removed from the recycled polyester fabric at the extraction temperature. Preferably, the extraction temperature of the extraction solvent is higher than the glass transition temperature of the polyester fabric. Therefore, the extraction efficiency of the extraction solvent with respect to the dyes and the coating glue can be effectively improved.

In one embodiment of the present disclosure, the color removal process includes: using an oxidizing agent and/or a reducing agent to trigger an oxidizing reaction and/or a reducing reaction of the dyes attached to the recycled polyester fabric, so that the dyes lose an original color thereof and the whiteness of the recycled polyester fabric is increased. It should be noted that the aforementioned oxidizing agent and/or reducing agent can be, for example, dissolved in water, so as to perform color removal on the dyes in the form of an aqueous solution.

The reducing agent is at least one material selected from a group consisting of sodium thiosulfate, sodium dithionite, sodium hydroxy-methane-sulfinate, thiourea dioxide, sodium hypophosphite, hydrogen, lithium aluminum hydride, sodium borohydride, carbon monoxide, hydrazine, and tin (II) chloride, but the present disclosure is not limited thereto. As long as the material type of the reducing agent can trigger a reducing reaction of the dyes to realize color removal, said reducing agent is within the scope and spirit of the present disclosure.

The oxidizing agent is at least one material selected from a group consisting of hydrogen peroxide, ozone, nitric acid, nitrates, potassium permanganate, sodium chlorate, calcium chlorate, chlorates, perchlorates, sodium hypochlorite, calcium hypochlorite, hypochlorites, sodium perborate, perborates, sodium dichromate, and dichromates, but the present disclosure is not limited thereto. As along as the material type of the oxidizing agent can trigger an oxidizing reaction of the dyes to realize color removal, said oxidizing agent is within the scope and spirit of the present disclosure.

The step S130 includes: performing a de-polymerization process which includes: using a chemical de-polymerization liquid to chemically depolymerize the recycled polyester fabric, so as to form a de-polymerization product containing bis(2-hydroxyethyl) terephthalate (BHET) and oligomers.

The chemical de-polymerization liquid can be, for example, ethylene glycol (EG), and a method for chemically depolymerizing the recycled polyester fabric can be, for example, an EG depolymerization method. Accordingly, the recycled polyester fabric can be depolymerized to form a de-polymerization product mainly containing BHET.

It is worth mentioning that the BHET is an intermediate between pure terephthalic acid (PTA) and ethylene glycol (EG). The BHET can also be used as a raw material for synthesizing polyester (PET), and can be further generated into a polyester copolymer with other monomers.

In one embodiment of the present disclosure, the de-polymerization process (step S130) is further defined to be performed after the color removal process (step S120) so that the dyes and/or the coating glue attached to the recycled polyester fabric are at least partially removed before the recycled polyester fabric is chemically depolymerized by the chemical de-polymerization liquid. Therefore, subsequent BHET purification procedures can be simplified.

The step S140 includes: performing a purification process, so as to enhance a purity of the BHET in the de-polymerization product.

In one embodiment of the present disclosure, the purification process includes: using an activated carbon to adsorb impurities (e.g., dyes and coating glue) remaining in the de-polymerization product to enhance the purity of BHET. Then, the purification process further includes: dissolving the purified BHET in water, and crystallizing BHET by a cooling process (e.g., from a high temperature of 80-100° C. to a low temperature of 20-30° C.).

It should be noted that the aforementioned purification process only includes 1 procedure of adsorbing the impurities with the activated carbon and 1 procedure of crystallizing the BHET in the water phase, but the present disclosure is not limited hereto. That is to say, the BHET purification procedures are simplified into 2 purification procedures. Compared with the conventional technology (which includes at least 5 purification procedures), this embodiment has the advantages of simple purification procedures, a low material recovery cost, etc.

The step S150 includes: performing a granulation process, so as to re-polymerize the purified BHET and form the recycled polyester chips (r-PET).

The r-PET can be formed by, for example, performing the granulation process on the polymerized BHET with a single-screw granulator or a twin-screw granulator.

In one embodiment of the present disclosure, the recycled polyester chips formed by the granulation process have a recovery rate (BHET recovery rate) of not less than 80% (preferably not less than 85%). Further, a second L value of the recycled polyester chips is not less than 55 (a=−2 to 2, and b=−6 to 6), and is slightly lower than the first L value of the aforementioned recycled polyester fabric. However, the present disclosure is not limited hereto.

Experimental Data and Test Results

In order to prove that the method for producing the recycled polyester chips from the recycled polyester fabric according to the embodiment of the present disclosure has a good effect, Examples 1-3 and Comparative examples 1-3 are used below for description.

Example 1

1 kg of a PET fabric (L=25%) is put into a 15 L glass tank, 10 kg of a PM solvent is added, and then color removal is performed at 132° C. for 1 hour. After cooling, fresh PM is used instead, and color removal is performed again at 132° C. for 1 hour and is repeated once. After extracting the PET fabric for 3 times with use of the PM solvent, 10 L of water is used to remove the PM solvent, and a white PET fabric (L=85%) is obtained after drying.

1 kg of the white PET fabric, 6 kg of ethylene glycol and 20 g of a zinc acetate catalyst are put into a 10 L three-necked glass bottle for being heated to 190° C. and stirred for 6 hours. Then, this reaction mixture is heated to reach and maintain at a boiling condition (195° C. to 210° C.). Surplus EG is distilled out, so that a residual amount of the EG in the reaction mixture is less than 5%.

After the reaction mixture is cooled to 90° C., 7 kg of water is added and heated to 90° C., so that BHET is dissolved in the water. 30 g of an activated carbon is added, and said mixture is stirred for 1 hour with the temperature maintained at 90° C. Then, the activated carbon is filtered out, and the resulting transparent aqueous solution is cooled to 5° C. to precipitate the BHET. After the BHET is filtered and dried, the BHET is further re-polymerized at 270° C. and 0.5 torr, so as to form r-PET.

The quality of the r-PET is L=63%, a=0.5, b=3.6, and a weight thereof is 890 g (with a yield of 89.0%).

Example 2

1 kg of a PET fabric (L=25%) is put into a 15 L glass tank, 10 kg of a toluene solvent is added, and then color removal is performed at 105° C. for 1 hour. After cooling, fresh toluene is used instead, and color removal is performed again at 132° C. for 1 hour and is repeated once. After extracting the PET fabric for 3 times with use of the toluene solvent, 10 L of acetone is used to remove the toluene solvent, and a white PET fabric (L=75%) is obtained after drying.

1 kg of the white PET fabric, 6 kg of ethylene glycol and 20 g of a zinc acetate catalyst are put into a 10 L three-necked glass bottle for being heated to 190° C. and stirred for 6 hours. Then, this reaction mixture is heated to reach and maintain at a boiling condition (195° C. to 210° C.). Surplus EG is distilled out, so that a residual amount of the EG in the reaction mixture is less than 5%.

After the reaction mixture is cooled to 90° C., 7 kg of water is added and heated to 90° C., so that BHET is dissolved in the water. 30 g of an activated carbon is added, and said mixture is stirred for 1 hour with the temperature maintained at 90° C. Then, the activated carbon is filtered out, and the resulting transparent aqueous solution is cooled to 5° C. to precipitate the BHET. After the BHET is filtered and dried, the BHET is further re-polymerized at 270° C. and 0.5 torr, so as to form r-PET.

The quality of the r-PET is L=60%, a=0.9, b=5.8, and a weight thereof is 872 g (with a yield of 87.2%).

Example 3

1 kg of a PET fabric (L=25%) is put into a 15 L glass tank, 10 kg of an aqueous solution of sodium thiosulfate is further added, and then color removal is performed at 135° C. for 1 hour, and the aqueous solution is discharged. Then, the resulting PET fabric is washed with 10 kg of water at 90° C., and a white PET fabric (L=82%) is obtained after drying.

1 kg of the white PET fabric, 6 kg of ethylene glycol and 20 g of a zinc acetate catalyst are put into a 10 L three-necked glass bottle for being heated to 190° C. and stirred for 6 hours. Then, this reaction mixture is heated to reach and maintain at a boiling condition (195° C. to 210° C.). Surplus EG is distilled out, so that a residual amount of the EG in the reaction mixture is less than 5%.

After the reaction mixture is cooled to 90° C., 7 kg of water is added and heated to 90° C., so that BHET is dissolved in the water. 30 g of an activated carbon is added, and said mixture is stirred for 1 hour with the temperature maintained at 90° C. Then, the activated carbon is filtered out, and the resulting transparent aqueous solution is cooled to 5° C. to precipitate the BHET. After the BHET is filtered and dried, the BHET is further re-polymerized at 270° C. and 0.5 torr, so as to form r-PET.

The quality of the r-PET is L=61%, a=0.8, b=5.2, and a weight thereof is 872 g (with a yield of 87.2%).

Comparative Example 1

1 kg of a PET fabric (L=25%), 6 kg of ethylene glycol and 20 g of a zinc acetate catalyst are put into a 10 L three-necked glass bottle for being heated to 190° C. and stirred for 6 hours. Then, this reaction mixture is heated to reach and maintain at a boiling condition (195° C. to 210° C.). Surplus EG is distilled out, so that a residual amount of the EG in the reaction mixture is less than 5%.

After the reaction mixture is cooled to 90° C., 7 kg of water is added and heated to 90° C., so that BHET is dissolved in the water. 30 g of an activated carbon is added, and said mixture is stirred for 1 hour with the temperature maintained at 90° C. Then, the activated carbon is filtered out, and the resulting transparent aqueous solution is cooled to 5° C. to precipitate the BHET. After the BHET is filtered and dried, the BHET is further re-polymerized at 270° C. and 0.5 torr, so as to form r-PET.

The quality of the r-PET is L=42%, a=2.9, b=20.6 and a weight thereof is 74.9 g (with a yield of 74.9%).

Comparative Example 2

1 kg of a PET fabric (L=25%), 6 kg of ethylene glycol and 20 g of a zinc acetate catalyst are put into a 10 L three-necked glass bottle for being heated to 190° C. and stirred for 6 hours. Then, such a mixture is cooled to 25° C. to crystallize BHET, and solid BHET is obtained by filtering.

The solid BHET is added with 7 kg of water and 30 g of an activated carbon, and is heated to 90° C., so that the BHET is dissolved in the water. Stirring is performed for 1 hour before the activated carbon is filtered out. The resulting filtrate is cooled to 5° C. to precipitate the BHET, and the solid BHET can be obtained by filtering. Then, the BHET is dried and further re-polymerized at 270° C. and 0.5 torr, so as to form r-PET.

The quality of the r-PET is L=45%, a=2.6, b=18.6 and a weight thereof is 694 g (with a yield of 69.4%).

Comparative Example 3

Compared with Comparative example 2, the activated carbon is increased from 30 g to 50 g. The quality of the r-PET: L=49%, a=2.4, b=12.6, and the weight is 597 g (with a yield of 59.7%).

Beneficial Effects of the Embodiments

In conclusion, in the method for producing the recycled polyester chips from the recycled polyester fabric provided by the present disclosure, by virtue of "providing the recycled polyester fabric attached with dyes and/or coating glue; performing a color removal process to at least partially remove the dyes and/or the coating glue attached to the polyester fabric; performing a de-polymerization process which includes: using a chemical de-polymerization liquid to chemically depolymerize the recycled polyester fabric, so as to form a de-polymerization product containing bis(2-hydroxyethyl) terephthalate (BHET) and oligomers; performing a purification process, so as to enhance a purity of the BHET in the de-polymerization product; and performing a granulation process, so as to re-polymerize the purified BHET and form the recycled polyester chips (r-PET)," process units in BHET purification procedures can be reduced, the complexity of BHET purification can be lowered, and a yield and a quality of the BHET can be improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for producing recycled polyester chips from a recycled polyester fabric, comprising:
   providing the recycled polyester fabric, wherein the recycled polyester fabric is attached with dyes and coating glue;
   performing a color removal process that includes:
      using an extraction solvent to infiltrate the recycled polyester fabric, so as to remove the coating glue and the dyes from the recycled polyester fabric; wherein the extraction solvent is propylene glycol methyl ether, and an extraction temperature of the extraction solvent is higher than a glass transition temperature of the recycled polyester fabric; wherein, after the color removal process, a content of the coating glue in the recycled polyester fabric is not greater than 200 ppm;
   performing a de-polymerization process which includes:
      using a chemical de-polymerization liquid to chemically depolymerize the recycled polyester fabric, so as to form a de-polymerization product containing bis(2-hydroxyethyl) terephthalate (BHET) and oligomers;
   performing a purification process, so as to enhance a purity of the BHET in the de-polymerization product; and
   performing a granulation process, so as to re-polymerize the purified BHET and form the recycled polyester chips (r-PET).

2. The method according to claim 1, wherein the recycled polyester chips formed by the granulation process have a recovery rate of not less than 80% and a second L value of not less than 55.

3. The method according to claim 1, wherein the de-polymerization process is further defined to be performed after the color removal process, so that the dyes and/or the coating glue attached to the recycled polyester fabric are at least partially removed before the recycled polyester fabric is chemically depolymerized by the chemical de-polymerization liquid.

4. The method according to claim 1, wherein the color removal process includes: using an oxidizing agent and/or a reducing agent to trigger an oxidizing reaction and/or a reducing reaction of the dyes attached to the recycled polyester fabric, so that the dyes lose an original color thereof and a whiteness of the recycled polyester fabric is increased.

5. The method according to claim 4, wherein the reducing agent is at least one material selected from a group consisting of sodium thiosulfate, sodium dithionite, sodium hydroxy-methane-sulfinate, thiourea dioxide, sodium hypophosphite, hydrogen, lithium aluminum hydride, sodium borohydride, zinc, carbon monoxide, hydrazine, and tin (II) chloride; wherein the oxidizing agent is at least one material selected from a group consisting of hydrogen peroxide, ozone, nitric acid, nitrates, potassium permanganate, sodium chlorate, calcium chlorate, chlorates, perchlorates, sodium hypochlorite, calcium hypochlorite, hypochlorites, sodium perborate, perborates, sodium dichromate, and dichromates.

6. The method according to claim 1, wherein the purification process includes: using an activated carbon to adsorb impurities remaining in the de-polymerization product, so as to enhance the purity of the BHET.

7. The method according to claim 6, wherein the purification process includes: dissolving the purified BHET in water, and crystallizing the BHET by a cooling process.

* * * * *